United States Patent
Puzella et al.

(10) Patent No.: US 9,124,361 B2
(45) Date of Patent: Sep. 1, 2015

(54) SCALABLE, ANALOG MONOPULSE NETWORK

(75) Inventors: Angelo M. Puzella, Marlborough, MA (US); Tunglin L. Tsai, Lexington, MA (US); John B. Francis, Littleon, MA (US); Donald A. Bozza, Billerica, MA (US); Kathe I. Scott, Westborough, MA (US); Patricia S. Dupuis, Medway, MA (US)

(73) Assignee: Raytheon Company, Waltham, MA (US)

( * ) Notice: Subject to any disclaimer, the term of this patent is extended or adjusted under 35 U.S.C. 154(b) by 509 days.

(21) Appl. No.: 13/267,193

(22) Filed: Oct. 6, 2011

(65) Prior Publication Data
US 2013/0088381 A1    Apr. 11, 2013

(51) Int. Cl.
*G01S 7/486*  (2006.01)
*H04B 17/00*  (2015.01)
*H01Q 25/02*  (2006.01)
(Continued)

(52) U.S. Cl.
CPC ............ *H04B 17/0062* (2013.01); *G01S 7/032* (2013.01); *G01S 13/4463* (2013.01); *H01Q 3/26* (2013.01); *H01Q 21/0025* (2013.01); *H01Q 21/0093* (2013.01); *H01Q 25/02* (2013.01); *H04B 17/21* (2015.01)

(58) Field of Classification Search
CPC . G01S 13/4463; G01S 13/44; G01S 13/4418; G01S 13/48; G01S 2013/0245; G01S 7/032; H04B 17/21; H04B 17/0062; H01Q 25/02; H01Q 3/26; H01Q 21/0025; H01Q 21/0093

USPC .................... 342/80, 149, 154, 372
See application file for complete search history.

(56) References Cited

U.S. PATENT DOCUMENTS 3,091,743 A    5/1963  Wilkinson
3,665,480 A    5/1972  Fassett
(Continued)

FOREIGN PATENT DOCUMENTS

EP    0 481 417 A1    4/1992
EP    1 764 863 A1    3/2007
(Continued)

OTHER PUBLICATIONS

U.S. Appl. No. 12/484,626, filed Jun. 15, 2009.
(Continued)

*Primary Examiner* — John B Sotomayor
*Assistant Examiner* — Marcus Windrich
(74) *Attorney, Agent, or Firm* — Daly, Crowley, Mofford & Durkee, LLP

(57) ABSTRACT

Embodiments of the concepts described herein are directed toward a common RF building block in the form of a monolithic assembly for an AESA array featuring a scalable RF design based on $2^n:3$ combining. The monopulse network building blocks are substantially identical, enabling an interchangeable sub-array architecture that is independent of position in the AESA aperture and receive sum channel sidelobe performance. In one embodiment, a passive Monopulse Beamformer may provide the passive $2^n:3$ RF coupling/combining network and an active Monopulse Processor may perform amplitude and phase weighting for the combined signals from the Monopulse Beamformer.

20 Claims, 11 Drawing Sheets

(51) Int. Cl.
- *H01Q 3/26* (2006.01)
- *H01Q 21/00* (2006.01)
- *G01S 7/03* (2006.01)
- *G01S 13/44* (2006.01)
- *H04B 17/21* (2015.01)

(56) References Cited

U.S. PATENT DOCUMENTS

| | | |
|---|---|---|
| 4,075,566 A | 2/1978 | D'Arcangelis |
| 4,489,363 A | 12/1984 | Goldberg |
| 4,527,165 A | 7/1985 | deRonde |
| 4,698,663 A | 10/1987 | Sugimoto et al. |
| 4,706,094 A | 11/1987 | Kubick |
| 4,751,513 A | 6/1988 | Daryoush et al. |
| 4,835,658 A | 5/1989 | Bonnefoy |
| 5,005,019 A | 4/1991 | Zaghloul et al. |
| 5,055,852 A | 10/1991 | Dusseux et al. |
| 5,099,254 A | 3/1992 | Tsukii et al. |
| 5,276,452 A | 1/1994 | Schuss et al. |
| 5,276,455 A | 1/1994 | Fitzsimmons et al. |
| 5,398,010 A | 3/1995 | Klebe |
| 5,400,040 A | 3/1995 | Lane et al. |
| 5,404,148 A | 4/1995 | Zwarts |
| 5,412,414 A | 5/1995 | Ast et al. |
| 5,451,969 A | 9/1995 | Toth et al. |
| 5,459,474 A | 10/1995 | Mattioli et al. |
| 5,461,389 A * | 10/1995 | Dean .............. 342/375 |
| 5,471,220 A | 11/1995 | Hammers et al. |
| 5,488,380 A | 1/1996 | Harvey et al. |
| 5,493,305 A | 2/1996 | Wooldridge et al. |
| 5,563,613 A | 10/1996 | Schroeder et al. |
| 5,592,178 A * | 1/1997 | Chang et al. ............ 342/372 |
| 5,592,363 A | 1/1997 | Atarashi et al. |
| 5,675,345 A | 10/1997 | Pozgay et al. |
| 5,724,048 A | 3/1998 | Remondiere |
| 5,786,792 A | 7/1998 | Bellus et al. |
| 5,854,607 A | 12/1998 | Kinghorn |
| 5,907,304 A | 5/1999 | Wilson et al. |
| 6,011,507 A | 1/2000 | Curran et al. |
| 6,037,903 A | 3/2000 | Lange et al. |
| 6,061,027 A | 5/2000 | Legay et al. |
| 6,078,289 A * | 6/2000 | Manoogian et al. ......... 342/373 |
| 6,087,988 A | 7/2000 | Pozgay |
| 6,091,373 A | 7/2000 | Raguenet |
| 6,104,343 A | 8/2000 | Brookner et al. |
| 6,127,985 A | 10/2000 | Guler |
| 6,166,705 A * | 12/2000 | Mast et al. .............. 343/853 |
| 6,181,280 B1 | 1/2001 | Kadambi et al. |
| 6,184,832 B1 | 2/2001 | Geyh et al. |
| 6,208,316 B1 | 3/2001 | Cahill |
| 6,211,824 B1 | 4/2001 | Holden et al. |
| 6,218,214 B1 | 4/2001 | Panchou et al. |
| 6,222,493 B1 | 4/2001 | Caille et al. |
| 6,225,695 B1 | 5/2001 | Chia et al. |
| 6,297,775 B1 | 10/2001 | Haws et al. |
| 6,388,620 B1 | 5/2002 | Bhattacharyya |
| 6,424,313 B1 | 7/2002 | Navarro et al. |
| 6,480,167 B2 | 11/2002 | Matthews |
| 6,483,705 B2 | 11/2002 | Snyder et al. |
| 6,611,180 B1 | 8/2003 | Puzella et al. |
| 6,621,470 B1 | 9/2003 | Boeringer et al. |
| 6,624,787 B2 | 9/2003 | Puzella et al. |
| 6,661,376 B2 | 12/2003 | Maceo et al. |
| 6,670,930 B2 | 12/2003 | Navarro |
| 6,686,885 B1 | 2/2004 | Barkdoll et al. |
| 6,703,976 B2 * | 3/2004 | Jacomb-Hood et al. ...... 342/373 |
| 6,711,814 B2 | 3/2004 | Barr et al. |
| 6,731,189 B2 | 5/2004 | Puzella et al. |
| 6,756,684 B2 | 6/2004 | Huang |
| 6,856,210 B2 | 2/2005 | Zhu et al. |
| 6,900,765 B2 | 5/2005 | Navarro et al. |
| 6,943,300 B2 | 9/2005 | Ekeberg et al. |
| 6,961,248 B2 | 11/2005 | Vincent et al. |
| 6,995,322 B2 | 2/2006 | Chan et al. |
| 7,030,712 B2 | 4/2006 | Brunette et al. |
| 7,061,446 B1 | 6/2006 | Short, Jr. et al. |
| 7,129,908 B2 | 10/2006 | Edward et al. |
| 7,132,990 B2 | 11/2006 | Stenger et al. |
| 7,180,745 B2 | 2/2007 | Mandel et al. |
| 7,187,342 B2 | 3/2007 | Heisen et al. |
| 7,298,235 B2 | 11/2007 | Hauhe et al. |
| 7,348,932 B1 | 3/2008 | Puzella et al. |
| 7,417,598 B2 | 8/2008 | Navarro et al. |
| 7,443,354 B2 | 10/2008 | Navarro et al. |
| 7,444,737 B2 | 11/2008 | Worl |
| 7,489,283 B2 | 2/2009 | Ingram et al. |
| 7,508,338 B2 | 3/2009 | Pluymers et al. |
| 7,545,323 B2 * | 6/2009 | Kalian et al. ............. 342/372 |
| 7,570,209 B2 * | 8/2009 | Shi et al. .............. 342/372 |
| 7,597,534 B2 | 10/2009 | Hopkins |
| 7,626,556 B1 | 12/2009 | Pluymers et al. |
| 7,671,696 B1 | 3/2010 | Puzella et al. |
| 7,982,664 B1 * | 7/2011 | Uscinowicz ............. 342/174 |
| 8,427,371 B2 | 4/2013 | Pozgay |
| 2002/0169578 A1 | 11/2002 | Yang |
| 2003/0184473 A1 * | 10/2003 | Yu .................. 342/380 |
| 2005/0110681 A1 | 5/2005 | Londre |
| 2005/0151215 A1 | 7/2005 | Hauhe et al. |
| 2006/0268518 A1 | 11/2006 | Edward et al. |
| 2007/0018821 A1 * | 1/2007 | Manoogian et al. ........... 342/80 |
| 2007/0152882 A1 | 7/2007 | Hash et al. |
| 2008/0106467 A1 | 5/2008 | Navarro et al. |
| 2008/0106482 A1 | 5/2008 | Cherrette et al. |
| 2008/0150832 A1 | 6/2008 | Ingram et al. |
| 2008/0316139 A1 | 12/2008 | Blaser et al. |
| 2010/0245179 A1 | 9/2010 | Puzella et al. |
| 2010/0259445 A1 * | 10/2010 | Corman et al. ............. 342/372 |

FOREIGN PATENT DOCUMENTS

| | | |
|---|---|---|
| EP | 1 436 859 B1 | 8/2007 |
| EP | 1 978 597 A1 | 10/2008 |
| JP | 4-122107 A | 4/1992 |
| JP | 06-097710 | 4/1994 |
| JP | 07-212125 | 8/1995 |
| JP | 2000-138525 A | 5/2000 |
| JP | 2003 179429 A | 6/2003 |
| JP | 2005 505963 | 2/2005 |
| KR | 1020010079872 A | 8/2001 |
| WO | WO 98/26642 | 6/1998 |
| WO | WO 99/66594 | 12/1999 |
| WO | WO 01/20720 A1 | 3/2001 |
| WO | WO 01/41257 A1 | 6/2001 |
| WO | WO 03/003031 A1 | 4/2003 |
| WO | WO 2007/136941 A2 | 11/2007 |
| WO | WO 2007/136941 A3 | 11/2007 |
| WO | WO 2008/010851 A2 | 1/2008 |
| WO | WO 2008/010851 A3 | 1/2008 |
| WO | WO 2008/036469 A1 | 3/2008 |

OTHER PUBLICATIONS

U.S. Appl. No. 10/441,366, filed May 20, 2003.
U.S. Appl. No. 12/533,178, filed Jul. 31, 2009.
U.S. Appl. No. 12/533,185, filed Jul. 31, 2009.
Bash et al.; "Improving Heat Transfer From a Flip-Chip Package;" Technology Industry; Email Alert RSS Feed; Hewlett-Packard Journal, Aug. 1997; 3 pages.
Carter; "'Fuzz Button' Interconnects at Microwave and MM-Wave Frequencies;" IEEE Seminar; London, UK; Mar. 1-Mar. 6, 2000; 7 sheets.
Jerinic, et al.; "X-Band "Tile" Array for Mobile Radar;" internal Raytheon Company publication; Spring 2003; 4 pages.
Marsh et al.; "5.4 Watt GaAs MESFET MMIC for Phased Array Radar Systems;" 1997 Workshop on High Performance Electron Devices for Microwave and Optoelectronic Applications, Nov. 24-25, 1997; pp. 169-174.
Puzella, et al.; "Digital Subarray for Large Apertures;" slide presentation; internal Raytheon Company publication; Sep. 14, 2004; pp. 1-22.
Div. Application (with translation of amended claims) as filed on Dec. 1, 2008 in Korean Intellectual Property office and assigned App. No. 10-2008-7029396.

(56) References Cited

OTHER PUBLICATIONS

Decision of Rejection dated Jul. 30, 2008 from KR Pat. App. No. 10-2004-7003900.
Notice of Trial Decision dated Mar. 23, 2010 from KR Pat. App. No. 10-2004-7003900.
EP Search Report for 06021905.2; dated Feb. 9, 2007; 8 pages.
European Office Action dated Nov. 3, 2005 from EP Pat. App. No. 02800372.1.
Response to European Office Action filed Jan. 12, 2007 from EP Pat. App. No. 02800372.1.
European Office Action dated Oct. 18, 2007 from EPO Pat. App. No. 06021905.2.
Response to European Office Action dated Oct. 18, 2007 filed in the EPO on Aug. 11, 2008 from EP Pat. App. No. 06021905.2.
Response to European Office Action dated Mar. 19, 2009 filed in the EPO on Nov. 19, 2009 from EP Pat. App. No. 06021905.2.
European Office Action dated Feb. 18, 2010 from EPO Pat. App. No. 06021905.2.
Notice of Allowance dated Feb. 2, 2007 from EP Pat. App. No. 02800372.1.
Korean Office Action dated Oct. 31, 2007 from KR Pat. App. No. 10-2004-7003900.
Response to Korean Office Action filed Mar. 26, 2008 from KR Pat. App. No. 10-2004-7003900.
Korean Office Action dated Feb. 25, 2009 from KR Pat. App. No. 10-2008-7029396.
Korean Office Action dated Nov. 27, 2009 from KR Pat. App. No. 10-2008-7029396.
Japanese Office Action dated Mar. 7, 2007 from JP Pat. App. No. 2003-533378.
Japanese Office Action dated Feb. 15, 2008 from JP Pat. App. No. 2003-533378.
Japanese Office Action dated Feb. 18, 2009 from JP Pat. App. No. 2003-533378.
Response to Japanese Office Action filed Jul. 5, 2007 from JP App. No. 2003-533378.
Response to Japanese Office Action filed Jun. 19, 2009 from App JP App. No. 2003-533378.
Office Action dated Jun. 11, 2010 from U.S. Appl. No. 12/694,450.
Response to Office Action of Jun. 11, 2010 from U.S. Appl. No. 12/694,450 dated Sep. 21, 2010.
Notice of Allowance dated Nov. 3, 2010 from U.S. Appl. No. 12/482,061.
Office action dated Dec. 1, 2010 from U.S. Appl. No. 12/694,450.
PCT International Preliminary Examination Report and Written Opinion of the ISA for PCT/US2002/30677 dated Nov. 27, 2003; 10 pages.
PCT Search Report mailed on Dec. 19, 2007 for PCT Pat. App. No. PCT/US2007/074795 filed on Jul. 31, 2007.
PCT Written Opinion mailed on Dec. 19, 2007 for PCT Pat. App. No. PCT/US2007/074795 filed on Jul. 31, 2007.
PCT International Preliminary Examination Report mailed on Apr. 2, 2009 for PCT Pat. App. No. PCT/US2007/074795 filed on Jul. 31, 2007.
U.S. Appl. No. 12/694,450, filed Jan. 27, 2010.
PCT Search Report of the ISA dated Jun. 20, 2011 for PCT Pat. App. No. PCT/US2011/028063; 5 pages.
PCT Written Opinion of the ISA dated Jun. 20, 2011 for PCT Pat. App. No. PCT/US2011/028063; 6 pages.
International Search Report of the ISA for PCT/US2012/052999 dated Dec. 6, 2012.
Written Opinion of the ISA for PCT/US2012/052999 dated Dec. 6, 2012.
International Preliminary Report on Patentability for Pat. Appl. No. PCT/US2011/028063.
EPO Rule 161 Communication dated Nov. 11, 2012 for Pat. Appl. No. 11711185.6.
Response to EPO Rule 161 Communication as filed on May 27, 2013 for Pat. Appl. No. 11711185.6.
Australian Office Action dated Oct. 4, 2013 for Pat. Appl. No. 2011238848.
Response to Australian Office Action as filed on Dec. 9, 2013 for Pat. Appl. No. 2011238848.
U.S. Appl. No. 12/757,371, filed Apr. 9, 2010.
PCT International Preliminary Report on Patentability for PCT/US2012/052999 dated Apr. 8, 20014.
Response to Rule 161(1) and 162 EPC dated May 24, 2014 as filed on Nov. 26, 2014 for Application No. 12759566.8 14 pages.
Examination Report dated Nov. 28, 2014 for Application No. 2012/319035 3 pages.
Response to Examination Report in the Australian Patent Office as filed on May 11, 2015 for Appl. No. 2013/319035.

\* cited by examiner

SCALABLE, ANALOG MONOPULSE NETWORK

FIELD OF THE INVENTION

The concepts and systems described herein relate generally to phased array antennas adapted for volume production at a relatively low cost and more particularly to Active Electronically Steered Arrays (AESAs) including a plurality of sub-array modules where each one of the sub-array modules are interchangeable.

BACKGROUND

Phased array antennas include a plurality of antenna elements spaced apart from each other by known distances coupled through a plurality of phase shifter circuits to either or both of a transmitter or receiver. There is a desire to lower acquisition and life cycle costs of radio frequency (RF) systems that utilize phased array antennas (or more simply "phased arrays"). One way to reduce costs when fabricating RF systems is to utilize printed wiring boards (PWBs) (also sometimes referred to as printed circuit boards or PCBs), which allow use of more effective manufacturing techniques.

As is known, phased array antenna systems are adapted to produce a beam of radio frequency energy (RE) and direct such beam along a selected direction by controlling the phase (via the phase shifter circuitry) of the RF energy passing between the transmitter or receiver and the array of antenna elements. In an electronically scanned phased array, the phase of the phase shifter circuits (and thus the beam direction) is selected by sending a control signal or word to each of the phase shifter sections. The control word is typically a digital signal representative of a desired phase shift, as well as a desired attenuation level and other control data.

Phased array antennas are often used in both defense and commercial electronic systems. For example, Active Electronically Scanned Arrays (AESAs) are in demand for a wide range of defense and commercial electronic systems such as radar surveillance, terrestrial and satellite communications, mobile telephony, navigation, identification, and electronic counter measures. Such systems are often used in radar for land base, ship and airborne radar systems and satellite communications systems. Thus, the systems are often deployed on a single structure such as a ship, aircraft, missile system, missile platform, satellite, or building where a limited amount of space is available.

AESAs offer numerous performance benefits over passive scanned arrays as well as mechanically steered apertures. However, the costs associated with deploying AESAs can limit their use to specialized military systems. An order of magnitude reduction in array cost could enable widespread AESA insertion into military and commercial systems for radar, communication, and electronic warfare (EW) applications. The performance and reliability benefits of AESA architectures could extend to a variety of platforms, including ships, aircraft, satellites, missiles, and submarines. Reducing fabrication costs and increasing the quantity of components being manufactured can drive down the costs of the components and thus the cost of the AESAs.

With the desire to reduce cost of antennas, and in particular the cost of antennas having relatively large apertures, it has become common to develop the antenna aperture as an array of active aperture sub-arrays. These sub-arrays typically have their own internal RF power dividers, driver amplifiers, time delay units, logic distribution networks, DC power distribution networks, DC/DC converters, and accessible ports for RF, logic, DC power, and thermal management interfaces. It would desirable if each of the sub-arrays could be manufactured the same and be used interchangeably in the fabrication of the complete array. But when the aperture is formed from sub-arrays, it has, heretofore, lacked flexibility because the RF distribution networks required for receive beam formation and exciter output distribution are hardwired into the aperture backplane and position dependent in detail. Thus, typical AESA apertures are not configured such that the sub-arrays are interchangeable.

To further complicate the problem, a tracking radar employing a highly directive antenna pattern (narrow main beam) seeks to keep the antenna electrical boresight aligned with a target of interest. The method typically used to track targets is monopulse beamforming where the angular location of a target is obtained by comparison of signals received simultaneously in two antenna patterns (called the "elevation monopulse pattern" and "azimuth monopulse pattern").

Presently, there are two basic approaches for AESA monopulse beamforming, analog beamforming, and combined analog-digital beamforming. In analog beamforming, an analog RF feed network combines each AESA Transmit/Receive (T/R) channel into sub-arrays; each sub-array has a unique RF feed network that is designed to couple and weight T/R channel RF receive signals to produce an array-level monopulse pattern in elevation and azimuth angle.

In combined analog-digital beamforming, an analog RF feed network combines each AESA T/R channel into sub-arrays where each unique RF feed network is designed to couple and weight T/R channel RF receive signals. Analog to Digital (A/D) converters at each sub-array produce digital signals that are then combined to form the final array level monopulse pattern in elevation and azimuth angle.

Thus, elevation and azimuth monopulse patterns can be generated with analog beamforming techniques, digital beamforming techniques, or a combination of both analog and digital beamforming.

What is needed is an AESA phased array architecture that enables the use of a beamforming RF feed network that is identical for each sub-array, provides the basic monopulse function, and reduces non-recurring engineering (NRE) cost.

SUMMARY

As indicated above, given a change in the active aperture dimension, sub-array dimension, or antenna sidelobe performance of a conventional Active Electronically Steered Array (AESA), it is necessary to completely re-design the feed network. This greatly increases AESA non-recurring engineering (NRE) cost as well as the time it takes to design and manufacture the AESA. In addition, regardless of whether a so-called "brick" or "panel architecture" is employed in the AESA, both the analog and digital beamforming approaches used in a typical AESA suffer from certain drawbacks themselves. For example, in analog beamforming architectures, the conventional approach is to design and fabricate a unique RF feed network for each sub-array. However, as noted above, this feed network must be completely re-designed given a change in the AESA active aperture dimension, sub-array dimension, or sidelobe performance.

Digital beamforming at the Transmit/Receive (T/R) element level generally provides design invariance to a change in AESA active aperture dimension, sub-array dimension, or sidelobe performance. However, digital beamforming at the T/R element level is presently cost prohibitive for any reasonably sized tracking AESA. And the combined analog-digital beamforming approach still suffers from the disadvantage of having to design unique RF feed networks for each sub-array.

In contrast to the above-described conventional approaches, exemplary embodiments of the concepts described herein are directed toward a common RF building block for an AESA array with the following attributes:

An array antenna manufactured in accordance with the concepts described herein is comprised of a plurality of substantially identical monopulse network sub-array building blocks. That is, modular construction is used. Each of the building blocks function independently of their particular location within the array and independently of a particular sidelobe performance. For a given RF band, an AESA aperture can be constructed as an m×n (m, n integers) array of identical RF monopulse network building blocks.

The monopulse network building block described herein is based on a mathematical formulation where the antenna element outputs are combined into a network. In one specific embodiment, each 2n inputs (n an integer) are combined to form three outputs, referred to herein as $2^n$:3 combining. The array scaling is controlled by the value chosen for n. Furthermore, the network can be optimized (that is, choosing "n") to meet radar system requirements (e.g., system noise figure, beam pointing accuracy, cost). There is a trade-off between the size of the beamforming network, n, and the RF losses in that beamformer. A larger beamforming network reduces the number of parts and subassemblies in an array—this helps to reduce overall complexity and cost. However, the larger beamforming network has higher RF losses (prior to any second stage amplification) and therefore a higher system noise figure. Thus, the system described herein is a scalable RF design.

The present architecture produces a modular sub-assembly because the monopulse network building blocks are substantially identical. This architecture enables an interchangeable sub-array architecture that is independent of position in the AESA aperture and is independent of AESA receive sum channel sidelobe performance (or, equivalently, aperture illumination distribution). The scalable, analog monopulse network provided in accordance with the concepts described herein may comprise two RF sub-assemblies or modules that form a common building block. In one exemplary embodiment, the two RF sub-assemblies are designated as the Monopulse Beamformer and the Monopulse Processor.

The Monopulse Beamformer provides a passive, analog $2^n$:3 RF coupling/combining network. The Monopulse Processor may be implemented as an active RF network with three RF inputs and three RF outputs, corresponding to the receive sum signal, receive delta elevation signal and receive delta azimuth signals employed in the well-known monopulse tracking function. It follows the Monopulse Beamformer and performs the appropriate amplitude and phase weighting for each of the three RF inputs from the Monopulse Beamformer.

The present invention thus extends the mathematical beamforming formulation from one-dimension to two-dimensions, as is further discussed below. It also advantageously provides AESA design flexibility to optimize the number of T/R channels combined (the factor "n" in the combiner ration) versus AESA noise figure performance and beam pointing accuracy.

Accordingly, the present invention enables a phased array architecture that employs an identical beamforming RF feed network in each sub-array that provides the necessary monopulse tracking function while reducing NRE cost.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present system are directed to an apparatus and associated techniques for monopulse beamforming in a modular Active Electronically Steered Array (AESA) element that results in a scalable, reusable sub-array architecture suitable for use over a wide range of phased array applications without costly element- or sub-array-level redesign.

The scalable, analog monopulse network of the present invention is based upon the mathematical formulation given in the commonly-owned and co-pending U.S. patent application Ser. No. 12/757,371 filed on Apr. 9, 2010 and entitled, "An RF Feed Network for Modular Active Aperture Electronically Steered Arrays," incorporated herein by reference in its entirety, further described hereinbelow.

Figure 1:
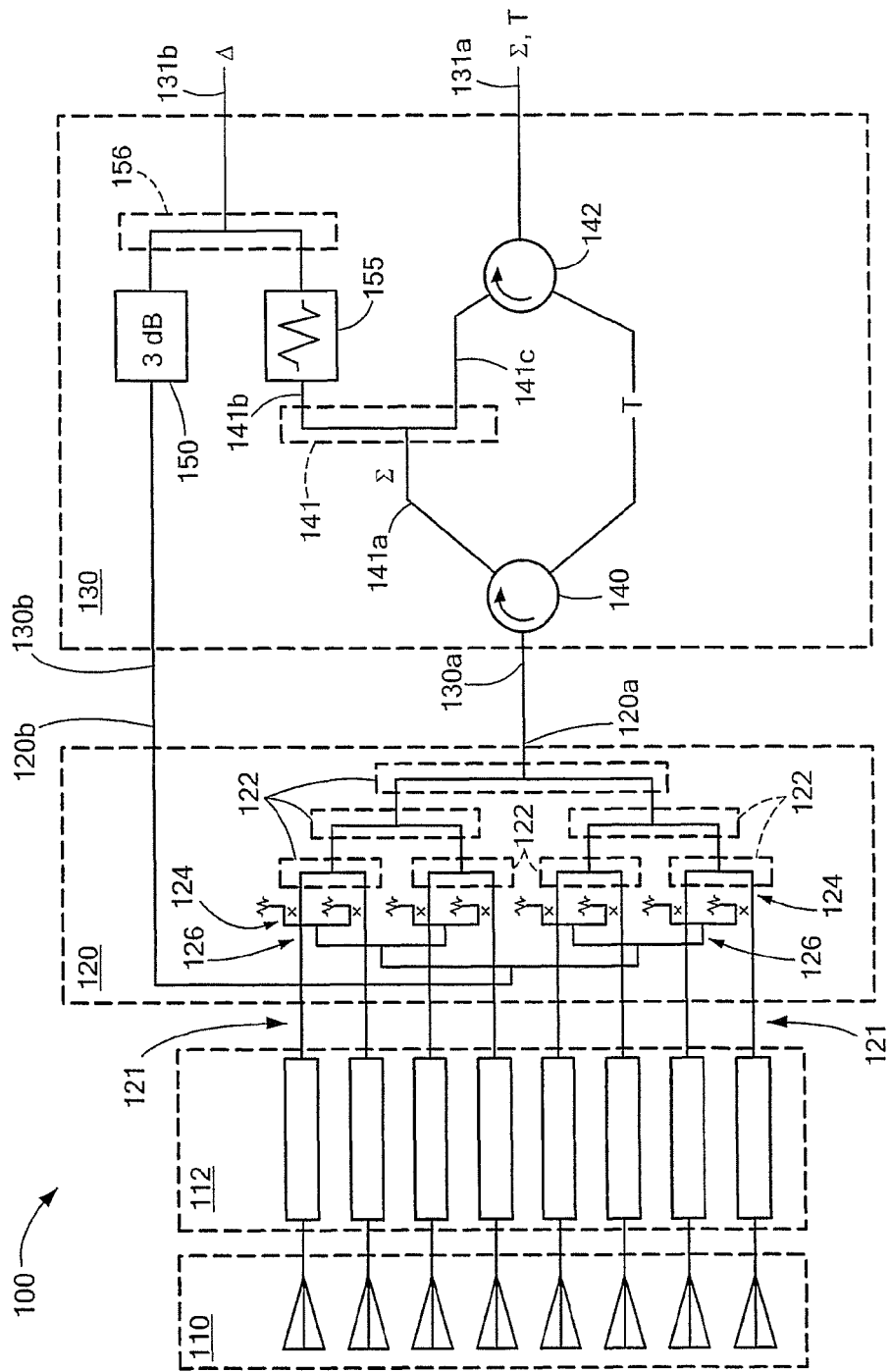
FIG. 1 is a diagram of a representative Active Electronically Steered Array (AESA) sub-array, according to one embodiment of the present invention.

Referring now to FIG. 1, an AESA sub-array module 100 constructed according to the teachings herein may comprise an array of antenna elements 110, coupled through analog elements 112 to beamformer antenna ports 121 of a passive, analog monopulse beamformer 120 (also sometimes referred to herein as simply "the beamformer"). Analog elements 112 of FIG. 1 may comprise conventional active transmit/receive (T/R) channel components, which (in some embodiments) comprise a power amplifier (PA), low noise amplifier (LNA), controller microwave monolithic integrated circuit (MMIC), and circulator. (Further details on embodiments of element 112 are provided below.) In this exemplary embodiment, beamformer 120 is implemented from a plurality of combiner/divider circuits 122, coupler circuits 124 and combiner/divider circuits 126. Beamformer 120 produces three outputs: a sum channel 120a, an azimuth delta channel, and an elevation delta channel. For simplicity of illustration (and since the processing is the same), only a single delta channel 120b is shown.

Beamformer signal ports 120a, 120b (representing the sum and delta monopulse signals) are coupled to monopulse beamformer ports 130a, 130b of active monopulse processor 130 (also sometimes referred to herein as the monopulse board). Monopulse processor 130 is comprised of circulators 140, 142 and power divider circuits 141, 156 configured to combine and condition the signals fed to ports 130a, 130b from beamformer 120 so as to enable conventional tracking and electronic beam steering.

Sub-array module 100, comprising the component assemblies noted above, is also referred to herein as a monolithic assembly because, when arrayed together, a number of these modules 100 may form a complete AESA phased array antenna without re-design or customization of the individual monolithic assemblies.

It should, of course, be appreciated that passive monopulse beamformer 120 may be implemented using a variety of different circuit components and techniques other than as shown in FIG. 1 so long as the components and techniques implement the mathematical formulation described herein and further explicated in the above-referenced commonly-owned and co-pending U.S. patent application Ser. No. 12/757,371 for proper operation of beamformer 120.

The passive monopulse beamformer 120 combines the signals from antenna elements 110 (as combined individually conditioned by T/R channel components 112) and forms the necessary monopulse function signals (delta elevation, delta azimuth, and sum) through techniques well-known in the RF arts.

Monopulse processor board 130 may then be used to condition either the delta azimuth or the delta elevation signals in addition to the sum signal; the same processor 130 may be simply duplicated to form both. Here, for clarity, only a single exemplary processor circuit is depicted, with the delta signal output labeled as "$\Delta$" for illustration. The monopulse processor board 130 thus controls the sub-array weighting on the delta azimuth, delta elevation, and sum channels by amplifying and conditioning the monopulse signals from the beamformer and interfaces. Monopulse processor 130 also interfaces with a conventional beam steering computer to enable the full range of phased array functions.

In one exemplary embodiment, the sum signal processing branch of monopulse processor 130 comprises circulator 140, which receives the sum signal from beamformer 120 and provides the signal to a first port 141a of a divider circuit 141. Divider circuit 141 splits the signal evenly between ports 141b, 141c.

The signal propagating through port 141c is coupled to a first port of a circulator 142 and propagates through a second circulator port to a monopulse processor signal port 131a (or a sum (E) port 131a) at which a sum (E) signal is provided.

The delta ($\Delta$) signal processing branch of monopulse processor 130 comprises amplifier 150, a weighting circuit 155 (which provides a weighting function) and a combiner circuit 156. The delta signal path from passive monopulse beamformer 120 is coupled to an input of RF amplifier 150. An output of amplifier 150 is coupled to a first input of combiner 156. A second input of combiner 156 is coupled through weighting circuit 155 to port 141b of divider circuit 141. Weighting circuit 155 selects the weighting level. The weighting levels are based on the physical location of the sub-array module 100 within the overall array aperture according to techniques well-known in the art.

The initial amplification in the delta signal path is initially set by the T/R channel components 112 at the output of the sub-array. RF amplifier 150 may act (in some exemplary embodiments) as a pad or buffer to further condition the signal level received from the output of monopulse beamformer 120.

The outputs of amplifier 150 and weighting circuit 155 are combined in combiner circuit 156 to form a delta ($\Delta$) signal which propagates to a monopulse processor signal port 131b at which a delta signal output is provided. The delta signal processing branch provides delta azimuth signals when connected to the azimuth outputs of beamformer 120; a similar (but independently weighted) circuit, connected to the elevation outputs of beamformer 120 produces the delta elevation signal.

In a transmit mode, a transmit signal T is provided to the second port of the circulator 142 and the signal propagates through a third port of circulator 142 to an input of circulator 140. The transmit signal propagates through circulator 142 to beamformer 120. The transmit signal is coupled from the beamformer input through a series of combiner/divider circuits 122 and through circuits 112 until the transmit signal is emitted through antenna elements 110.

Although a sub-array comprised of a plurality of antenna elements and two assemblies or modules (i.e., the beamformer and the monopulse processor) is described, those skilled in the art will realize that functional and/or mechanical partitions other than that described can be used. Accordingly, the concepts, systems, and techniques described herein are not limited to any particular partition of these functions onto one, two, three or more modules. Likewise, although an amplifier function providing 3 dB of gain is illustrated, more or less gain (or even attenuation), dependant on the actual circuit implementation and system configuration, may be necessary. In general, a low noise amplifier may be used to set the gain level. This may, in some embodiments, be the same LNA as is used in circuit 112. One of ordinary skill in the art will appreciate that this is not a restriction and that one is free to choose a different LNA with different gain and noise figure parameters. In general, using the same LNA in circuit 112 and in monopulse processor 130 simplifies DC power distribution and logic control in the array. Such variations are well within the skill level of an ordinary practitioner and can be readily determined without undue experimentation. Accordingly, the amount of gain provided by amplifier 150 should not be considered as limiting the scope of the present invention.

As noted above, beamformer 120 comprises, in one exemplary embodiment, an RF coupling network that forms the basic delta elevation and delta azimuth RF signals. Signal formation is based on the fundamental (one-dimensional) relationships, shown in Equations (1A), (1B) and (1C) and well-known in the art, between the array illumination function on the receive sum channel, f(x), and the far-field pattern g(y) (i.e., the receive sum pattern) at position y in the far-field. The derivative illumination is obtained from the Fourier transform relations:

$$g(y) = \int_{-\infty}^{\infty} f(x) \cdot e^{jxy} dx \quad (1A)$$

and $$j^n \frac{d^n}{dy^n} g(y) = \int x^n \cdot f(x) \cdot e^{jxy} dx \quad (1B)$$

Equation (1A) represents the Fourier transform of the function f(x), which is g(y). Equation (1B) is the well known result that the $n^{th}$ derivative of g(y) is the Fourier transform of the original function f(x) multiplied by $x^n$. Equation (1C) is the case for the first derivative of g(y):

$$j \frac{dg(y)}{dy} = \int x \cdot f(x) \cdot e^{jxy} dx \quad (1C)$$

Thus, the derivative illumination is given by the anti-symmetric function: $x*f(x)$.

The derivative illumination distribution for the phased array is simply the position of the element within the array aperture, $x_{m,n}$, multiplied by the sampled receive sum channel distribution illumination, $f_{m,n}$. For a discrete phased array, the integrals become sums: the sampled, derivative difference distribution at point $x_{m,n}$, with inter-element spacing $d_x$ is given by the general result in Equation (1D):

$$x_{m,n} \cdot f_{m,n} = \left\{ n \cdot d_x + \left[ (m-1) \cdot N - \frac{M \cdot N + 1}{2} \right] \cdot d_x \right\} \cdot f_{m,n} / (M \cdot N \cdot d_s) \quad (1D)$$

Upon re-arranging, we arrive at:

$$x_{m,n} \cdot f_{m,n} = \left[ \frac{\left(n - \frac{1}{2}\right)}{M \cdot N} + \frac{2 \cdot (m-1) \cdot N - M \cdot N}{2 \cdot M \cdot N} \right] \cdot f_{m,n} \quad (2)$$

The first term is a weighting that depends only on the position of the element n within the sub-array; this term determines the attenuator weighting for the beamformer "coupled" signal. The second term is a weighting that depends only on the position of the sub-array, m, within the array aperture; this term determines the attenuator weighting for the "replica" signal. This is a function of the sub-array's position indices m, n, where:

M: total number of sub-arrays
N: total number of T/R channels within a given sub-array
m: $m^{th}$ sub-array. Note that the $m^{th}$ sub-array may be comprised of a beamformer and a monopulse processor.
n: $n^{th}$ element index in the $m^{th}$ active sub-array. In FIG. 1, n=1 to 8; in an alternate implementation, n=1 to 16
$g_{m,n}$: T/R channel weighting (in both amplitude and phase) for the $n^{th}$ element in the $m^{th}$ sub-array Thus, for every sub-array, m, Equation (2) defines the theoretical weightings for the coupled and replica signals.

In one exemplary embodiment, the first term within the brackets of Equation (2) may be implemented solely by coupler circuits 124 within the beamformer 120, where the elements are coupled passively, dependant on their respective index (or location) within the array. The second term within the brackets, which controls the weighting of the monopulse signals for the entire sub-array, may be likewise dependant only on the sub-array index. This term may be implemented in the weighting circuit 155 of the monopulse processor 130.

The monopulse beamformer 120 may be a passive, RF coupling network. One of ordinary skill in the art will appreciate that the present formulation may be generalized for any $2^n$:3 beamforming network. In the mathematical formulation, combining is one dimensional, as a sub-array of T/R channels. In one exemplary embodiment, the monopulse beamformer may be implemented as two-dimensional RF network combining eight rows of 16 T/R channels to form a 128:3 monopulse beamformer network. One of ordinary skill in the art will recognize that combinations of more or fewer elements may also be employed subject only to the $2^n$:3 limitation herein described. Accordingly, the present invention should be understood as not limited by the exemplary depictions of the number of elements shown and described herein. In general, the present apparatus may combine multiple rows of multiple T/R channels to form a two-dimensional beamformer network of any size.

Figure 2:
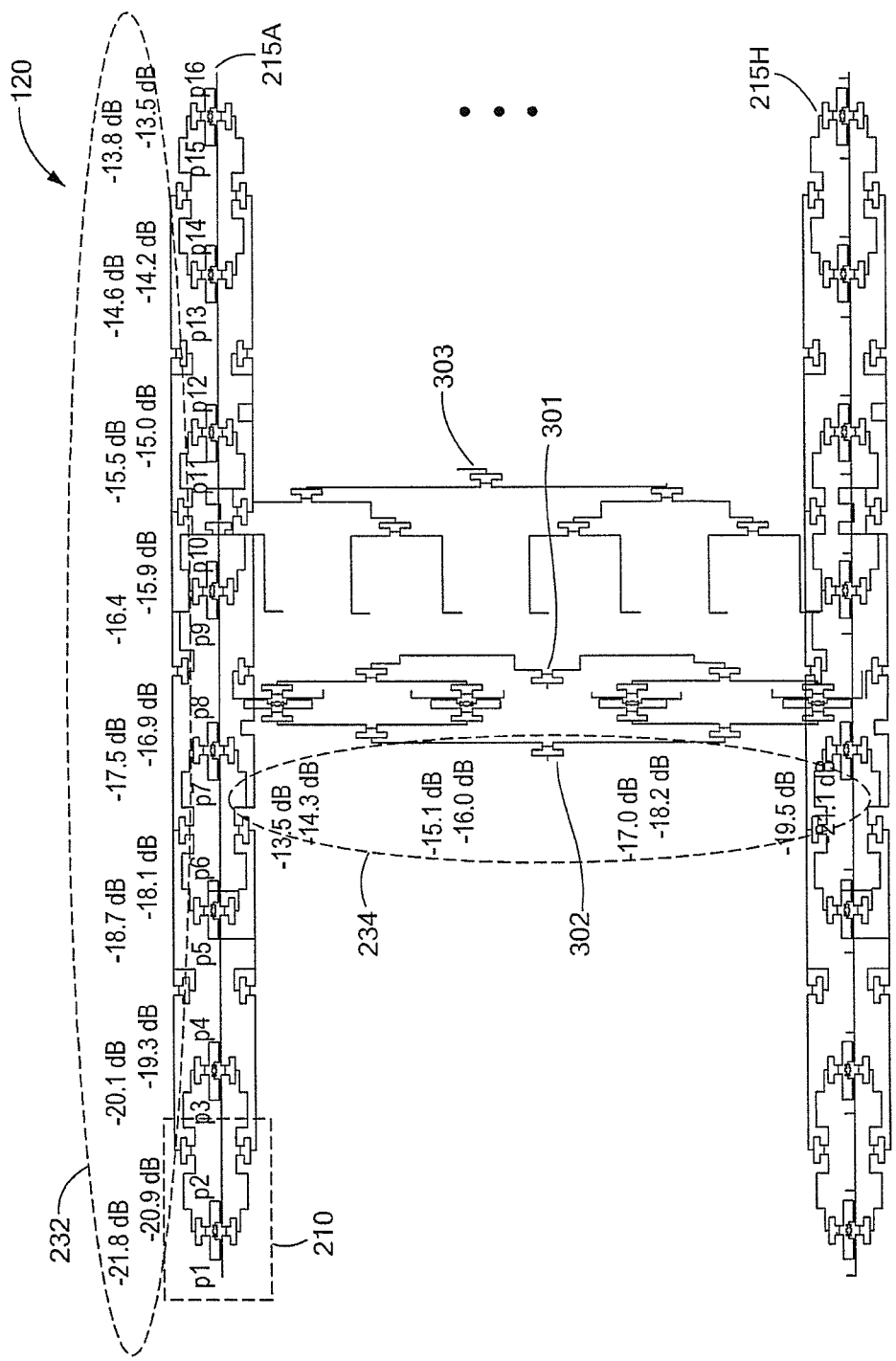
FIG. 2 is a diagram of a beamformer implemented for an eight (8) row×sixteen (16) column sub-array and associated azimuth and elevation coupler values, according to one embodiment of the present invention.

Exemplar coupled weightings for a representative monopulse beamformer 120 are given by the first bracketed term in Equation (2). FIG. 2 shows one embodiment of a beamformer 120 (implemented for an eight row×16 column [i.e., 128 element] sub-array) and associated azimuth 232 and elevation 234 coupler values, each generated using Equation (2). Eight azimuth coupling networks 210 in each of two of the eight rows 215A-215H are shown, along with one elevation coupling network 220. (In terms of the higher-level depiction on FIG. 1, the azimuth coupling networks represented by rows 215A-215H correspond to antenna ports 121.)

Note that beamformer 120 may also be implemented using eight elevation coupling networks (combining eight T/R Channels) and one azimuth coupling network (combining the 16 columns of elevation coupling networks). Such flexibility in implementation is part and parcel of the present invention.

Figure 3A:
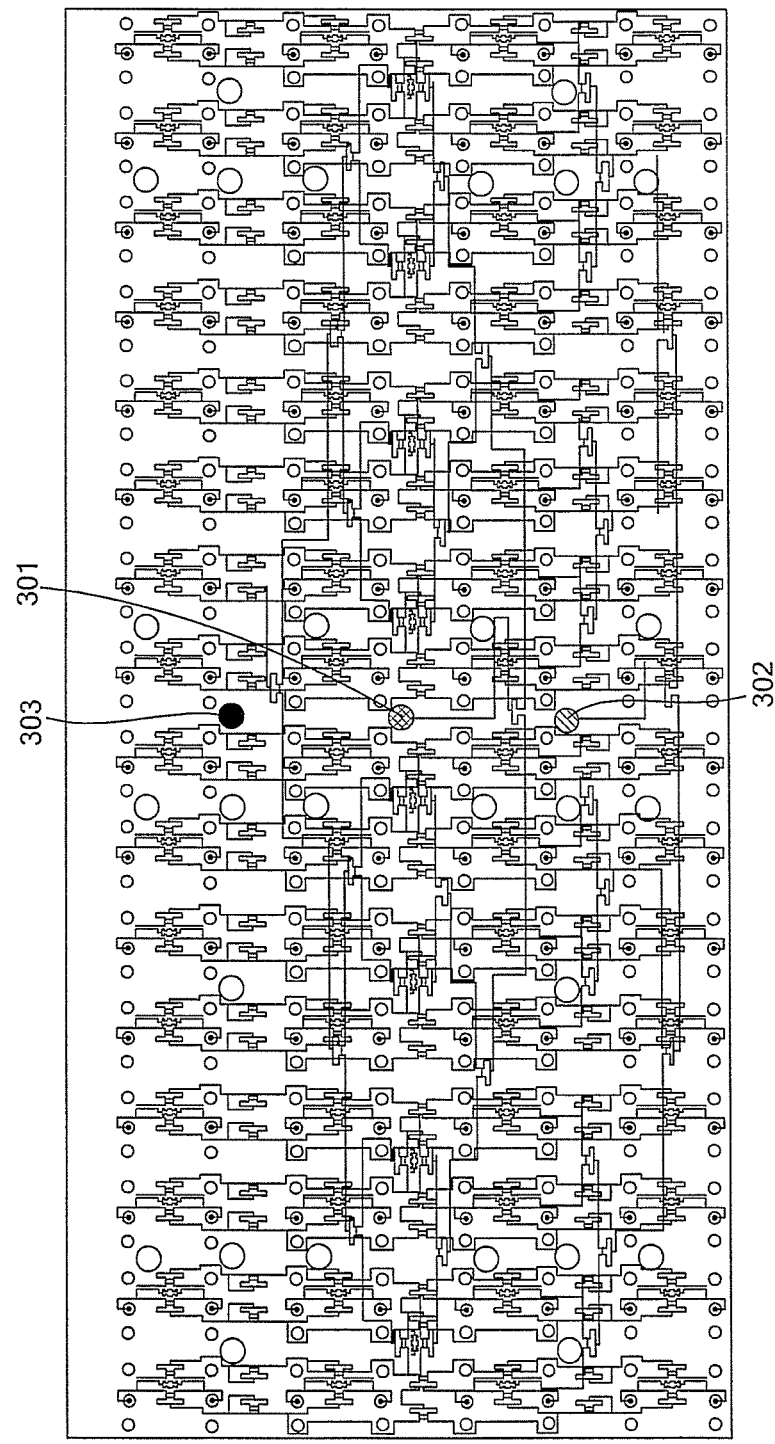
FIG. 3A depicts a representative circuit layout for the representative beamformer of FIG. 2, according to one exemplary embodiment.

FIG. 3A shows a representative stripline layout for an implementation of beamformer 120, according to one exemplary embodiment. In this view, the stripline circuit layout is implemented in three layers, shown superimposed one above the other. The 128:3 ($2^7$:3) RF network depicted comprises the following RF input/output (I/O) connections: Port 301 conveys the transmit/receive (TX/RX) sum signal; Port 302 conveys the receive (RX) delta elevation signal; and Port 303 conveys the RX delta azimuth signal. (These signal outputs are also shown in FIG. 2, for clarity.) In other words, FIG. 3A shows a realization of beamformer 120 as an 8 row by 16 column beamformer circuit: 301 is the Transmit/Receive Sum port; 302 is the Receive Delta Elevation port; 303 is the Receive Delta Azimuth port.

Figure 3B:
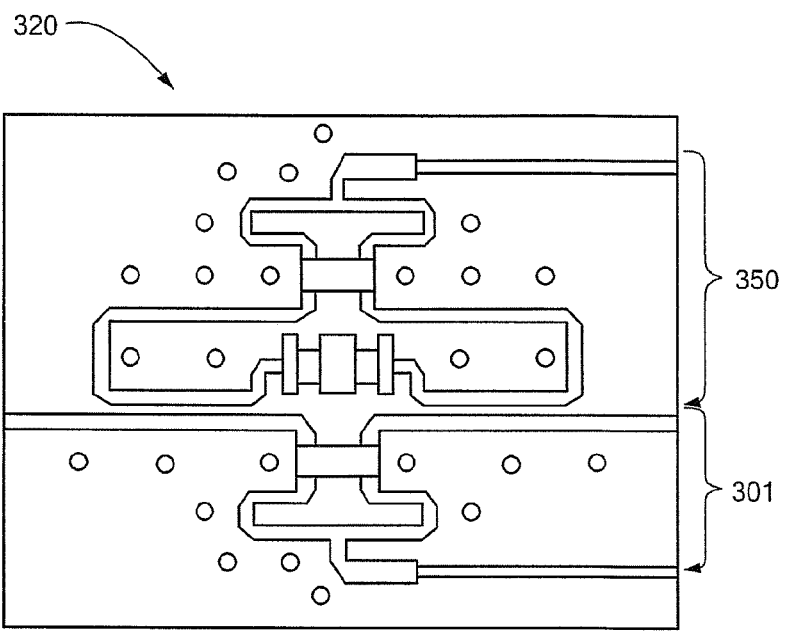
FIG. 3B depicts a representative Wilkinson divider/combiner building block circuit suitable for use in the stripline circuits of FIG. 3A, according to one embodiment of the present invention.
Figure 3C:
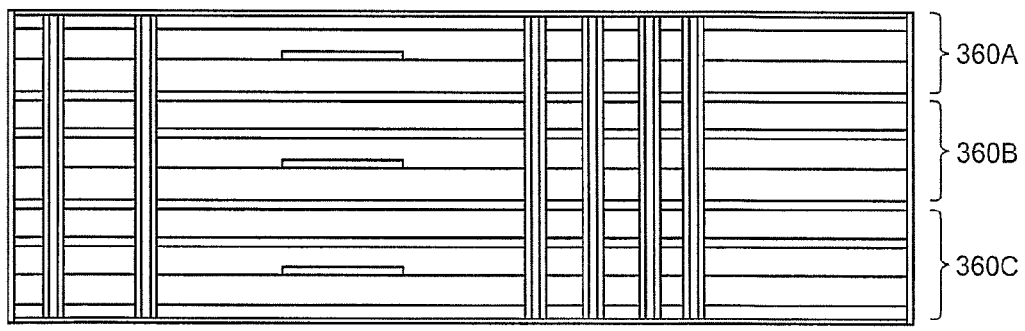
FIG. 3C is a cross-sectional view of the stripline circuits implementation of the representative circuit of FIG. 3A, according to one embodiment of the present invention.

As described above with respect to FIG. 3A, the RF circuits may be fabricated on three stripline layers 360A-360C as shown in the notional cross-sectional view of FIG. 3C. FIG. 3C thus depicts a cross-sectional stack-up of an exemplary printed wiring board constructed according to the circuit layout of FIG. 3A. The PWB is comprised of three separate stripline circuits; the circuits on layers 2, 5, and 8 are interconnected with plated through-hole vias.

Referring now to FIG. 3B, a passive combiner building block 320 from which a passive monopulse beamformer may be provided (such as beamformer 120 discussed above in conjunction with FIG. 1) includes a transmit-receive (TX/RX) sum channel portion provided from a conventional Wilkinson divider/combiner circuit having a port 301 corresponding to a TX/RX sum signal port. Passive combiner building block 320 also includes a coupled channel portion provided from a conventional Wilkinson divider/combiner circuit having a port 350 corresponding to the coupled channel output, which is either the delta azimuth or delta elevation signal. This is thus one exemplary embodiment of a passive combiner unit cell layout for a uniform beamformer circuit 301 and coupled beamformer circuit 350; both circuits are based on the standard Wilkinson 4-port divider/combiner with the fourth port terminated in a resistor.

The coupled port weightings of circuit 350 (depicted as coupler circuits 124 within the T/R channel front end, FIG. 1) are determined by the first term in Equation (4):

$$20 \cdot \text{Log}\left[\frac{\left|n - \frac{1}{2}\right|}{M \cdot N}\right] (dB) \quad (4)$$

Note that the coupler value depends only on the element position, n, within the sub-array.

Figure 4:
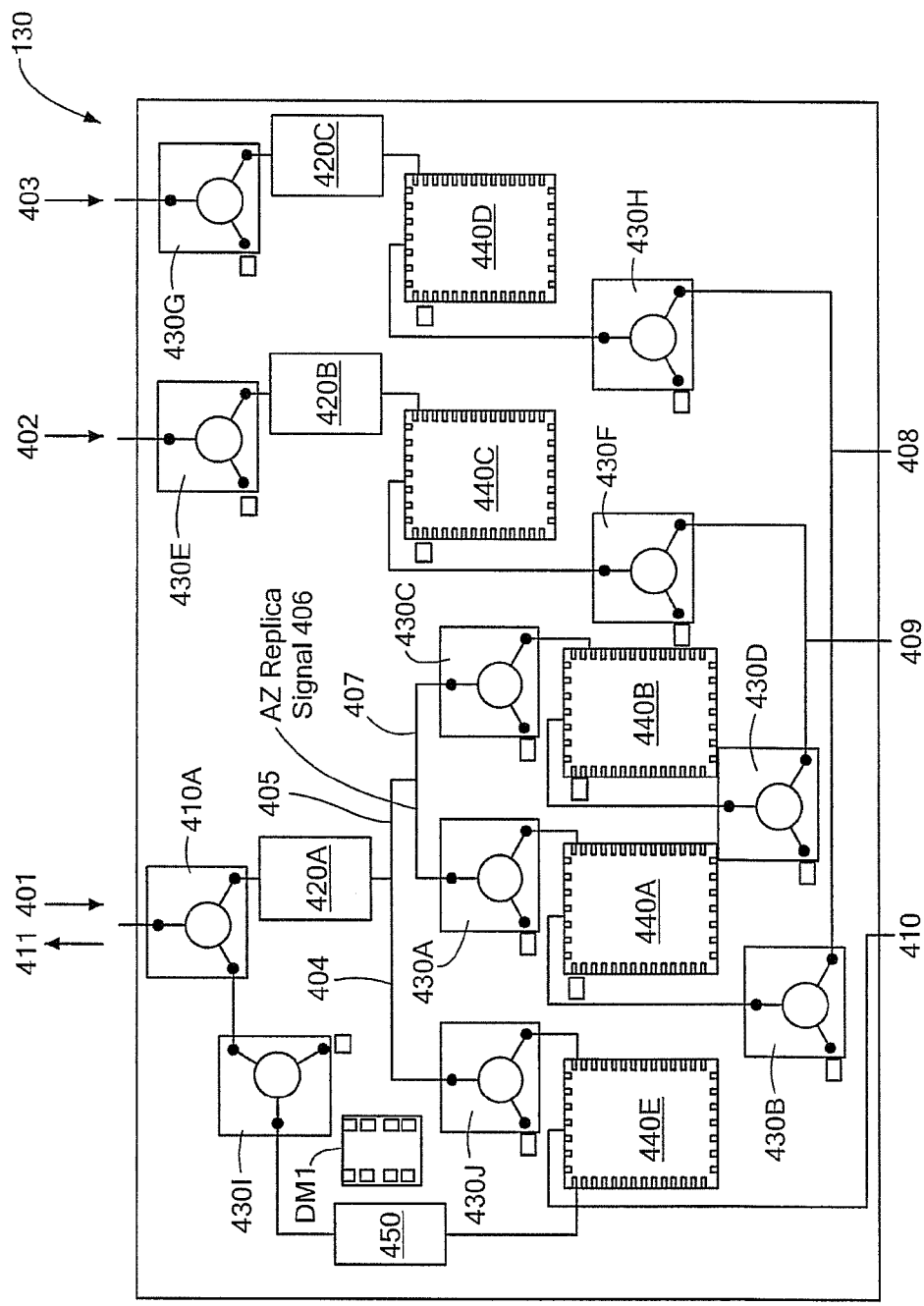
FIG. 4 depicts a high-level block diagram of a representative circuit layout for an active monopulse processor, according to one embodiment of the present invention.

FIG. 4 depicts a high-level block diagram of a representative circuit layout for an active monopulse processor 130 according to one embodiment of the present invention. As shown on top of the figure, there are three RF input signals 401, 402, and 403 to this module, each described in further detail in the following paragraphs. There may be a fourth signal, the transmit (TX) output signal, as well. As noted above, the amplitude weighting functions (illustrated schematically by weighting circuit 155 in FIG. 1) for each channel are determined by the second bracketed term of Equation (2), $$20 \cdot \text{Log}\left[\frac{2 \cdot (m-1) \cdot N - M \cdot N}{2 \cdot M \cdot N}\right] (dB), \quad (5)$$

and applied electronically by controllers 440A-440D. Note that the replica attenuation depends only on the sub-array index, m, within the array. Addition of active electronic components 440A and 440B provides design flexibility by allowing a relatively wide range of electronic attenuator weighting as well as electronic insertion phase. Addition of active electronic components 440C and 440D provides another degree of freedom to correct for amplitude differences between the replica and coupled paths due to manufacturing, material and component tolerances in circuits 120 and 130 and electronic insertion phase. Addition of active electronic component 440A is used to drive power amplifier 450A during the transmit pulse; in receive, attenuation may be added to minimize the overall weighting on the T/R channels in sub-array module 100. Controllers 440A-440D thus provide amplitude and phase level adjustment for each signal path in the monopulse processor.

The Receive Sum Channel (RX Σ) signal 401 passes through circulator 410A and is amplified by Low Noise Amplifier (LNA) 420A and split into the Receive Sum signal 404 and Replica Channel signal 405. The Replica Channel signal 405 is again split into the following signals:

Azimuth Replica signal 406, which goes through isolator 430A, active controller 440A, and finally through isolator 430B; the signal is then combined with the processed Receive Delta Azimuth Channel signal 403 to produce the Receive Delta Azimuth (RX Δ Az) Channel Output 408.

Elevation Replica signal 407, which goes through isolator 430C, active controller 440B, and finally through isolator 430D; the signal is then combined with the processed Receive Delta Elevation Channel signal 402 to produce the Receive Delta Elevation (RX Δ El) Channel Output 409.

Receive Sum signal 404 proceeds through isolator 430J and active controller 440E to produce RX Sum Channel Output 410.

Receive Delta Elevation (RX Δ El) Channel signal 402 proceeds through isolator 430E, amplifier LNA 420B, active controller 440C, and finally through isolator 430F. The signal is then combined with Elevation Replica signal 407 to produce the Receive Delta Elevation Channel Output 409.

Receive Delta Azimuth (RX Δ Az) Channel signal 403 proceeds through isolator 430G, amplifier LNA 420C, active controller 440D and finally passes through isolator 430H. The signal is then combined with the Azimuth Replica signal 406 to produce the Receive Delta Azimuth Channel Output 408.

The Transmit Channel input 410 proceeds first through controller 440E, power amplifier 450, through isolator 430I and finally through circulator 410A before leaving the module as TX signal Output 411. Controller 440E provides drive power amplification to PA 450 on transmit; on receive, Controller 440E provides phase and attenuation control for the Receive Sum channel output. Controller 440E does not differ from controllers 440A-440D in terms of phase and attenuation control in receive mode; 440A-440D have the capability to also provide drive power amplification in transmit mode, but this function may not be used in some implementations.

Circuit DM1 of FIG. 4 may be, in some exemplary embodiments, a drain modulator circuit that controls PA 450. DM1 controls the drain voltage, and hence drain current, to the power amplifier 450; that is, DM1 acts as a switch. Controller 440A provides the control signal to turn DM1 on. During transmit, DM1 is "on" and voltage is applied to the PA drain circuit; during receive, DM1 is off and hence the PA is off.

Each output 408, 409, 410 goes to a uniform combiner: one for the Transmit Channel Input/RX Sum Channel Output 410, one for the Receive Delta Elevation Channel Output 409, and one for the Receive Delta Azimuth Channel Output 408.

In some embodiments, the active controller devices 440A-440E may be employed to correct amplitude and phase imbalances in each signal path. This is desirable because, since each monopulse processor combines a number of T/R channels, the amplitude and phase errors have a de-correlation based on the number of sub-arrays.

Manufacturing considerations require that the range of coupler weightings and the range of variable attenuator weightings (Equation (2), first and second term, respectively) are realizable. This is accomplished by moving the reference point (i.e., the "center" of the sub-array) of Equation (2) by adding $(\text{ref}_{sub}-1)/(M*N)$ to the first term and subtracting $(\text{ref}_{sub}-1)/(M*N)$ from the second term in Equation (2). The choice of $\text{ref}_{sub}$ is any real number from n=1 to N. The bracketed term in Equation (3) is the foundation employed in the design for circuits 120 and 130.

$$x_{m,n} \cdot f_{m,n} = \left[\frac{\left(n - \frac{1}{2}\right) + (\text{ref}_{sub} - 1)}{M \cdot N} + \frac{2 \cdot (m-1) \cdot N - M \cdot N - 2 \cdot (\text{ref}_{sub} - 1)}{2 \cdot M \cdot N}\right] \cdot f_{m,n} \quad (3)$$

Equation (3) provides a trade-off between manufacturable coupler values versus a larger range in variable attenuator weighting. The first term determines the T/R signal weighting in coupler circuits 124; the second term the variable attenuator weighting in weighting circuit 155. Specifically, electronic components 440A through 440E offer a range of electronic attenuation settings and a range of electronic insertion phase shift. For example, in some embodiments, the SiGe Common Leg Circuit can provide attenuation in a range of 0 dB to 31 dB in 1 dB steps and insertion phase shift over a range of 5.625° to 354.375° in 5.625° steps. A large range in electronic attenuation (as determined by the second term in Equation (3)) enables manufacturable coupler values (as determined by the first term in Equation (3)).

In some implementations of the present systems and methods, the insertion phase of the Coupled El path (or Coupled Az path) is electronically adjusted using 440C (440D) to be in phase with the Receive Sum output insertion phase 410. The insertion phase of the El Replica signal 407 (or Az Replica signal 406) is then adjusted by 440B (440A) to be either in phase with the Coupled El path (or Coupled Az path) or 180° out of phase with the Coupled El path (Coupled Az path), depending on the relative sign between the first and second terms.

In one exemplary embodiment, transmit-side controller 440E may be implemented with a SiGe Common Leg Circuit (CLC) in conjunction with a 6-bit phase shifter and a 5-bit attenuator control.

In some embodiments, active controllers 440A-44E may be implemented in one or more Silicon-Germanium (SiGe) monolithic microwave integrated circuits (MMICs) devices, utilizing methods well-known to those of skill in the arts. Likewise, other implementations are also possible and known to the ordinary practitioner. Accordingly, the present invention is to be understood as not limited by the manner in which the controller function may be implemented and includes all such implementations.

In an alternate embodiment, the SiGe controller MMIC may be replaced by a controller implementing similar functionality in Gallium Arsenide (GaAs). In one exemplary embodiment, controllers 440A-440E may be implemented using Raytheon Company part number SSM1886 for all or some of controllers 440A-440E. In an alternate embodiments, a similar controller implemented in GaAs may also be used for controllers 440A-44E. Likewise, the PA and LNA functions of T/R channel components 112 and/or monopulse processor 130 may be implemented in GaAs using Raytheon part numbers PA-0608 and LN-0211, respectively. Drain modulator DM1 may be implemented using Raytheon Company part number SSM1860.

One of ordinary skill in the art will readily appreciate that the components and functions of the present system may also be implemented using COTS parts for one or more of the controllers 440A-440E, T/R channel components 112, PAs, LNAs, and/or DM1. Such implementations are well within the skill of an ordinary practitioner in these arts.

Overall AESA noise performance may be improved by the noted use of appropriate LNAs in each of the Receive Sum Channel, Receive Delta Elevation Channel, and Receive Delta Azimuth Channel RF paths. In some embodiments, one or more of low noise amplifiers 420A-420D may be implemented in a Gallium Arsenide (GaAs) MMIC, although alternatives will be readily apparent to those of ordinary skill in the art. Furthermore, these components may be fabricated as part of a MMIC or may be separate components.

Isolation devices (e.g., isolators) are placed at the input and output in each signal path of the monopulse processor, thus greatly improving RF isolation between signal paths and improving the RF match in each signal path. Isolators 430A-430H reduce unwanted coupling as a function of frequency, which may be critical given the higher degree of correlated errors between monopulse processors. In some embodiments, one or more of isolators 430A-430H may be implemented as embedded circulators with a terminated port and may be fabricated as part of a MMIC or may be separate components.

In some embodiments, power amplifier 450 may be implemented in a Gallium Nitride (GaN) MMIC, although alternatives will be readily apparent to those of ordinary skill in the art. Furthermore, these components may be fabricated as part of a MMIC or may be separate components.

The active controllers 440A-44E, low noise amplifiers 420A-420D, and power amplifier 450 in the monopulse processor may be implemented as flip-chip MMICs, according to techniques commonly used in the art. This enables using the same brazement to heat sink the MMICs on the monopulse processor and any associated circuitry. In some embodiments, the T/R channel components may be mounted on a separate printed wiring board or daughter-cards for convenience in handling and test. This may be advantageous for improving gain and phase stability for all MMICs, especially for those used in the monopulse processor.

Overall AESA noise performance may be improved by the noted use of appropriate LNAs in each of the Receive Sum Channel, Receive Delta Elevation Channel, and Receive Delta Azimuth Channel RF paths.

Figure 5:
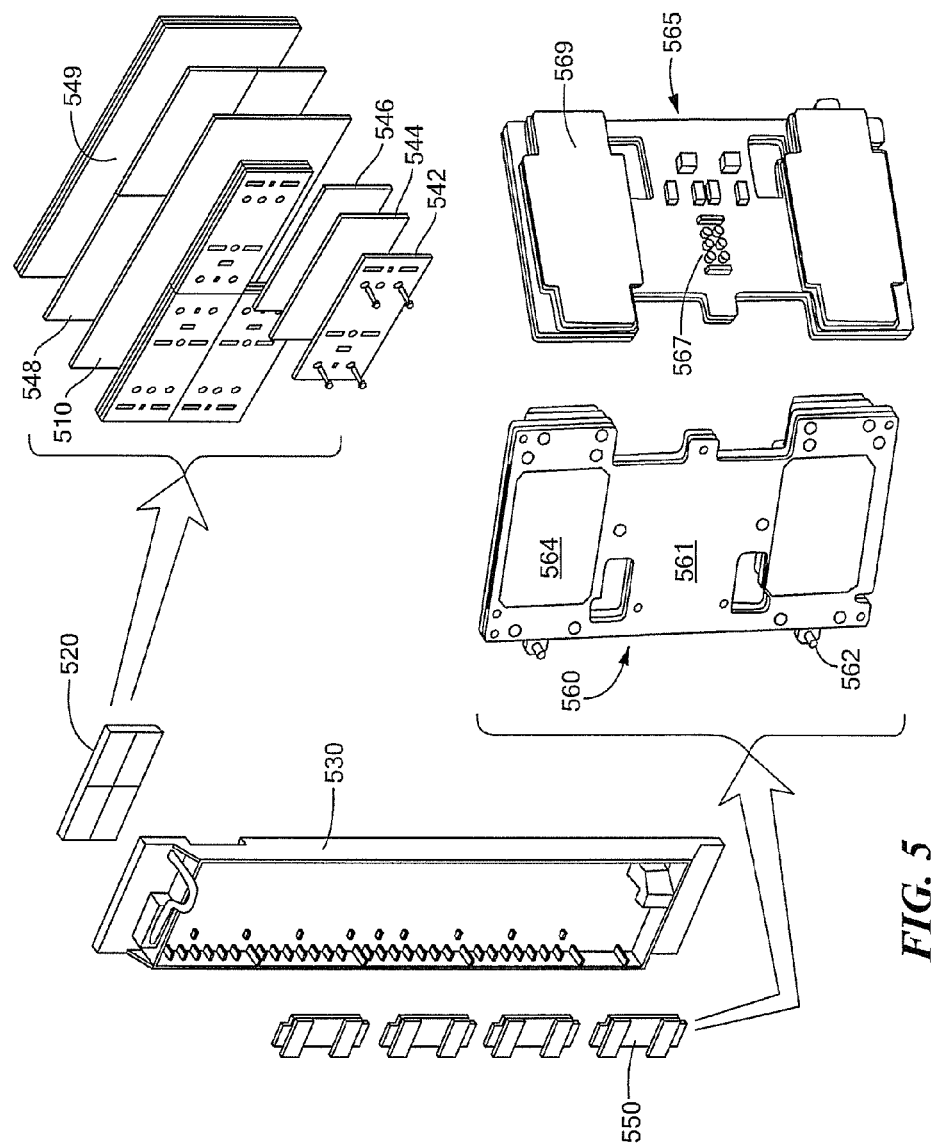
FIG. 5 depicts both sides of a monopulse processor, according to one embodiment of the present invention.

FIG. 5 depicts a high-level assembly view of a Line Replaceable Unit (LRU) constructed according to one embodiment of the present invention. In this exemplary embodiment, monopulse beamformer 510 forms part of a 128 T/R channel sub-array module 520; the entire LRU comprises eight such 128 T/R channel sub-array modules 520. Also depicted are the 128 unit cell antenna panel 549; 32 T/R channel daughter card 544; and thermal spreader plate 542 for daughter card 544. RF interposers 546 and 548 function as RF transmission lines that conduct RF signals via pads from 32 T/R channel daughter card 544 to monopulse beamformer 510 and between monopulse beamformer 510 and the 128 unit cell antenna panel 549.

Panel brazement assembly 530 forms the mounting surface for a plurality of monopulse processors 550. Monopulse processor 550 may, in some embodiments, be comprised of: carrier plate 561; thermal "gap-pad" material 564 used to heat sink the MMICs on the monopulse processor 550 to panel brazement assembly 530; RF connection 562 (one of the three RX Channels) to the 128 T/R channel sub-array module 520; monopulse processor circulator/isolator sub-assembly 569; and monopulse processor printed wiring board 567. Note that the monopulse processor comprises two active beamforming networks; each network is shown as reference 130 in FIG. 4.

Each 128 T/R channel sub-array module 520 may be mounted to one side of panel brazement (or similar support structure, without limitation) 530 which may be, in some embodiments, a liquid-cooled heat sink. The monopulse beamformer 510 may be a 128:3 printed wiring board network and physically part of the 128 T/R channel sub-array 520. In some embodiments, the monopulse processor(s) 550 may be mounted to the other side of panel brazement 530 (opposite the sub-array modules 520) with the controllers (not shown) attached to the monopulse processor disposed so as to dissipate their waste heat to brazement 530 through conventional means.

Figure 9:
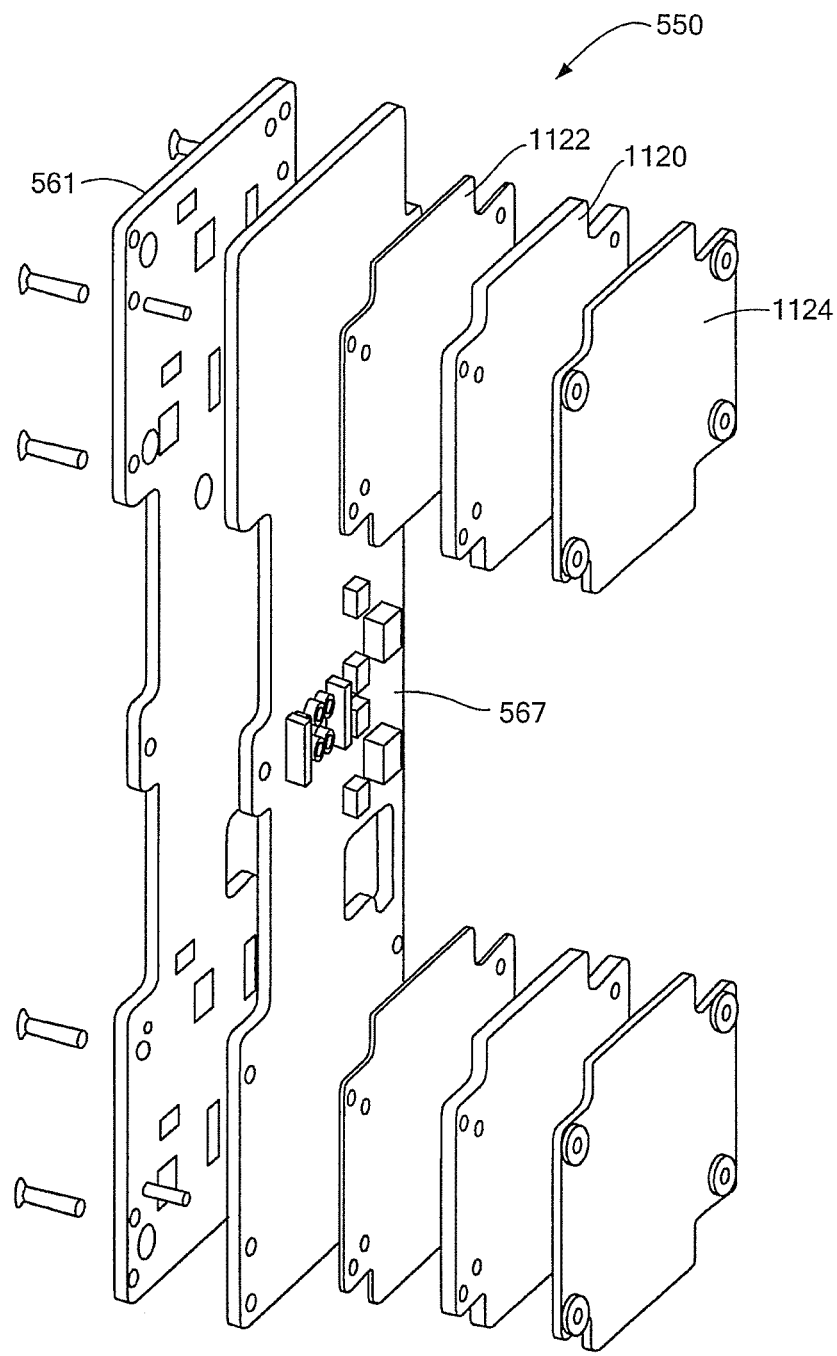
FIG. 9 depicts certain details of the mechanical assembly of a monopulse processor module of FIG. 5, according to one embodiment of the present invention.

FIG. 5 illustrates both sides of monopulse processor 550, referred to herein as the component side 560 and the circulator/isolator side 565. The component side may serve as the mounting side for the MMICs and other components. In some embodiments, monopulse processor 550 may be comprised of four sub-assemblies: monopulse printed wiring board (PWB) 567, monopulse interposer 1122 (shown in FIG. 9; not visible in FIG. 5), monopulse circulator/isolator 569, circulator top plate 1124 (shown in FIG. 9; not visible in FIG. 5), and a carrier plate 561 (shown in FIG. 9; not visible in FIG. 5) which serves as the heat spreader for the active components, such as but not limited to MMICs.

Figures 6A, 6B:
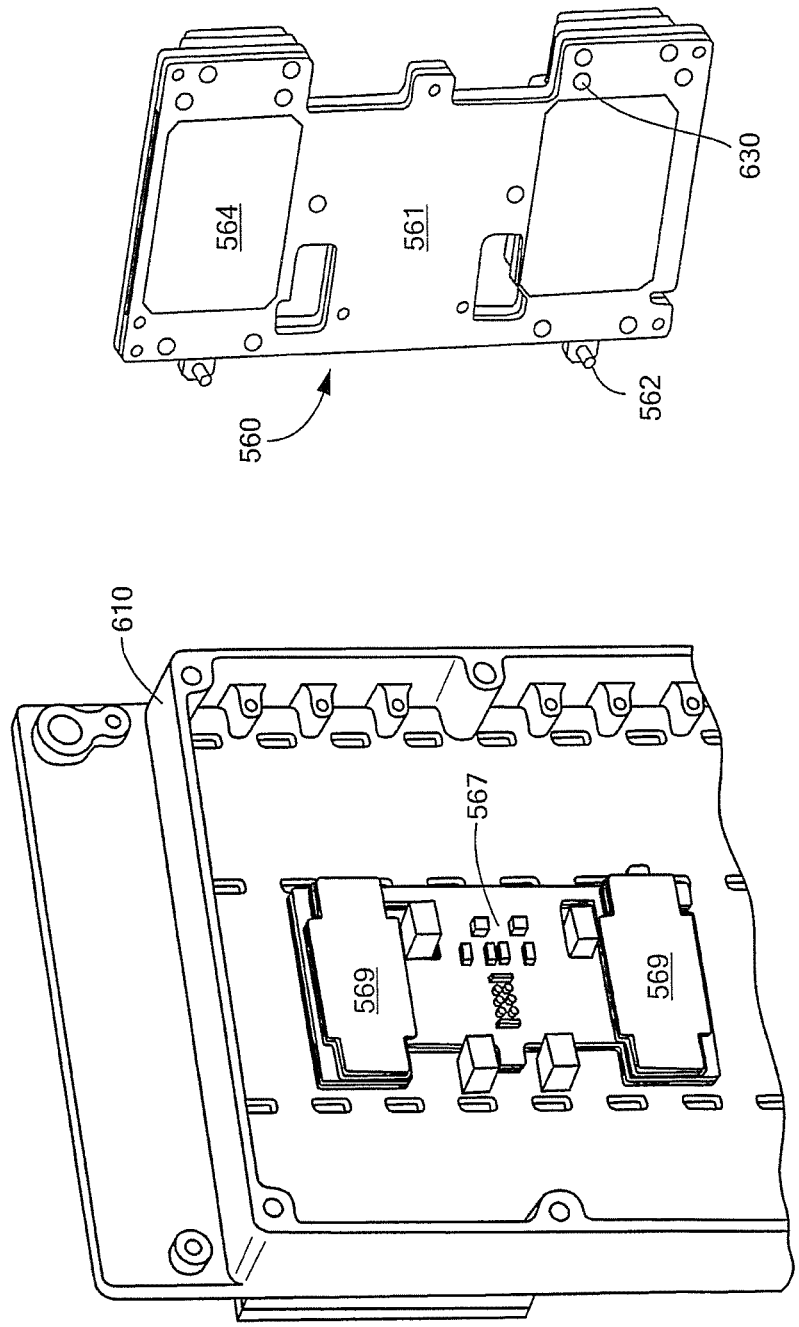
FIGS. 6A-6D depict exploded views of certain components and structures in a representative line replaceable unit (LRU) constructed according to one embodiment of the present invention.

FIGS. 6A-6D, 7, and 8 show several close-up views of a prototype LRU. FIG. 6A illustrates the placement of one exemplary embodiment of monopulse processor 569 on brazement 610. As in FIG. 5, two monopulse circulator/isolators 569 are shown on the circulator/isolator side 565 of monopulse PWB 567. FIG. 6B depicts the component side 560 of carrier plate 561 demounted from brazement 610.

Figure 6D:
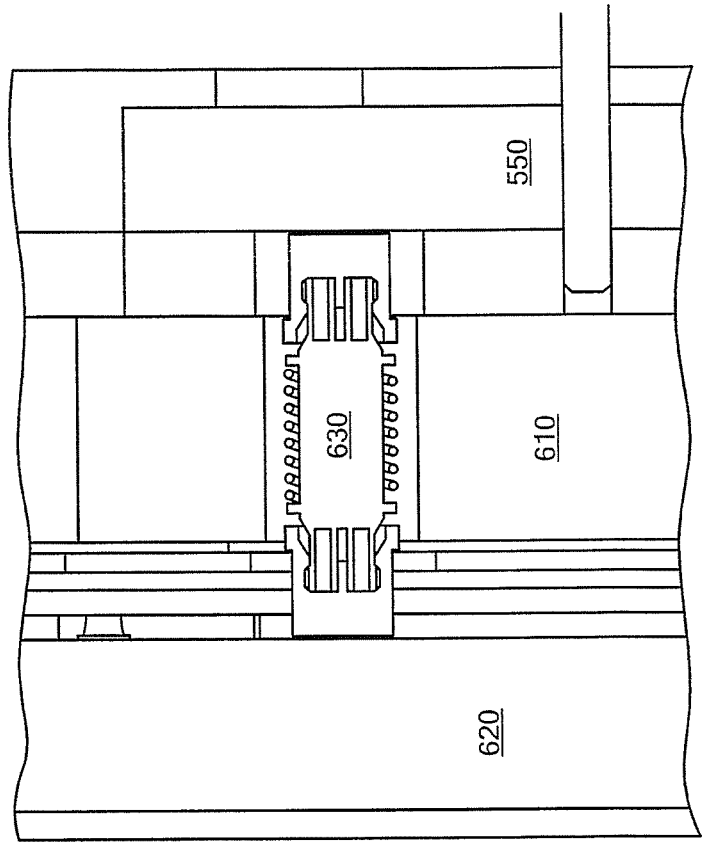
Figure 6C:
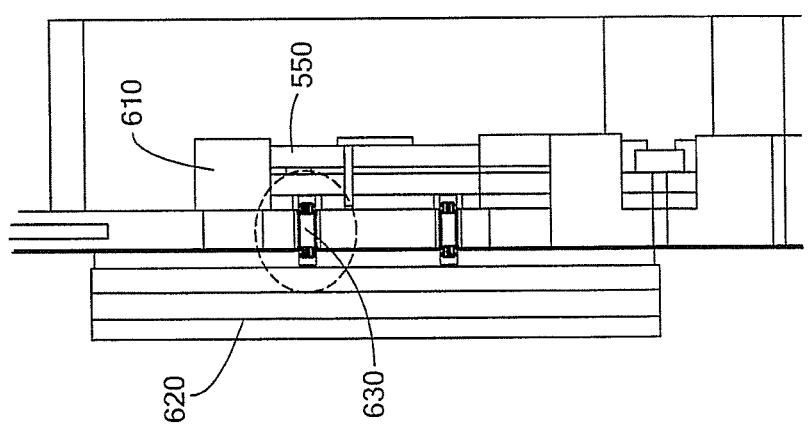

FIG. 6C is a close-up, cross-sectional view through brazement 610 showing the antenna element panel 620 (which includes beamformer module 520, not shown) mounted to the "outside" of brazement 610 and connected to the monopulse processor 550 via RF bullet connectors 630. In some exemplary embodiments, RF bullet 630 is a COTS part, available from Micro-Mode Products, Inc. of El Cajon, Calif., part number MSSP-10582.

FIG. 6D provides an expanded view of an RF bullet connector 630, according to one embodiment of the present invention. These devices are employed to conduct RF energy from beamformer module 520 through brazement 610 and onto monopulse processor module 550. Although an RF bullet connector is described, those skilled in the art will realize that RF connectors other than the particular an RF bullet connector shown here can be used. Accordingly, the concepts, systems, and techniques described herein are not limited to any particular type of RF connectors.

Figure 7:
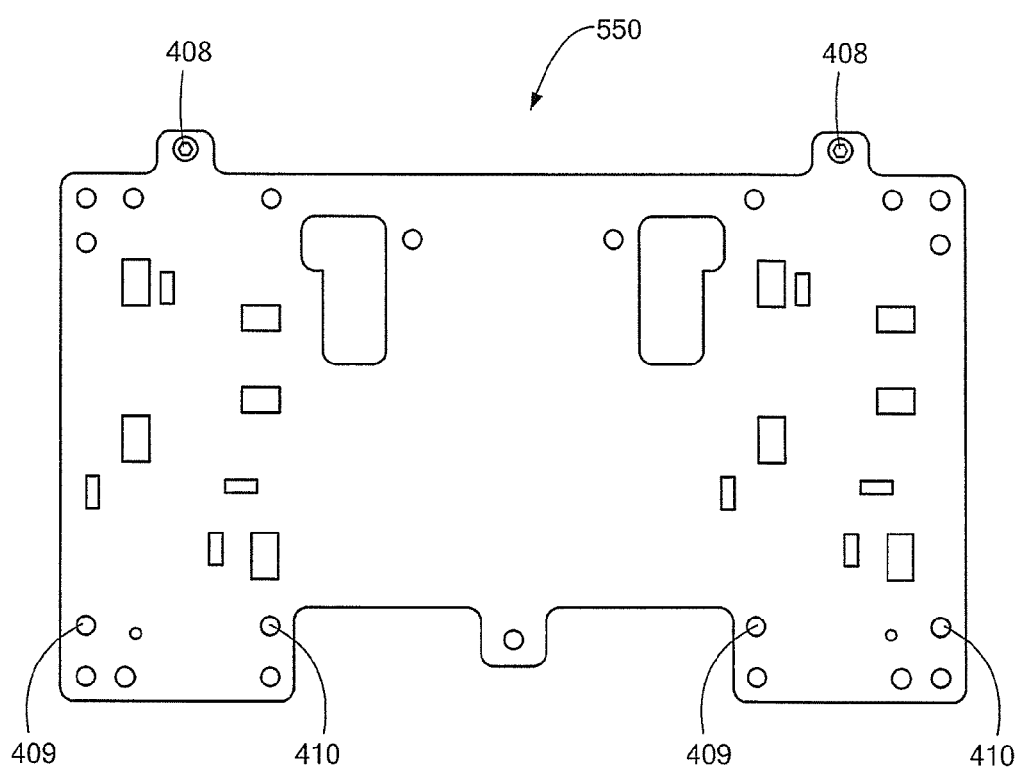
FIGS. 7 and 8 are photographs of a prototype implementation of the representative LRU of FIGS. 6A-6D.

FIG. 7 illustrates certain of the component and structural placements on the component side 560 of monopulse processor module 550 and the locations of Delta Azimuth Channel Output 408, Delta Elevation Channel Output 409, and TX/RX Sum Channel Output 410. As noted above, each half of the module may be configured to serve a separate antenna element panel (not shown).

Figure 8:
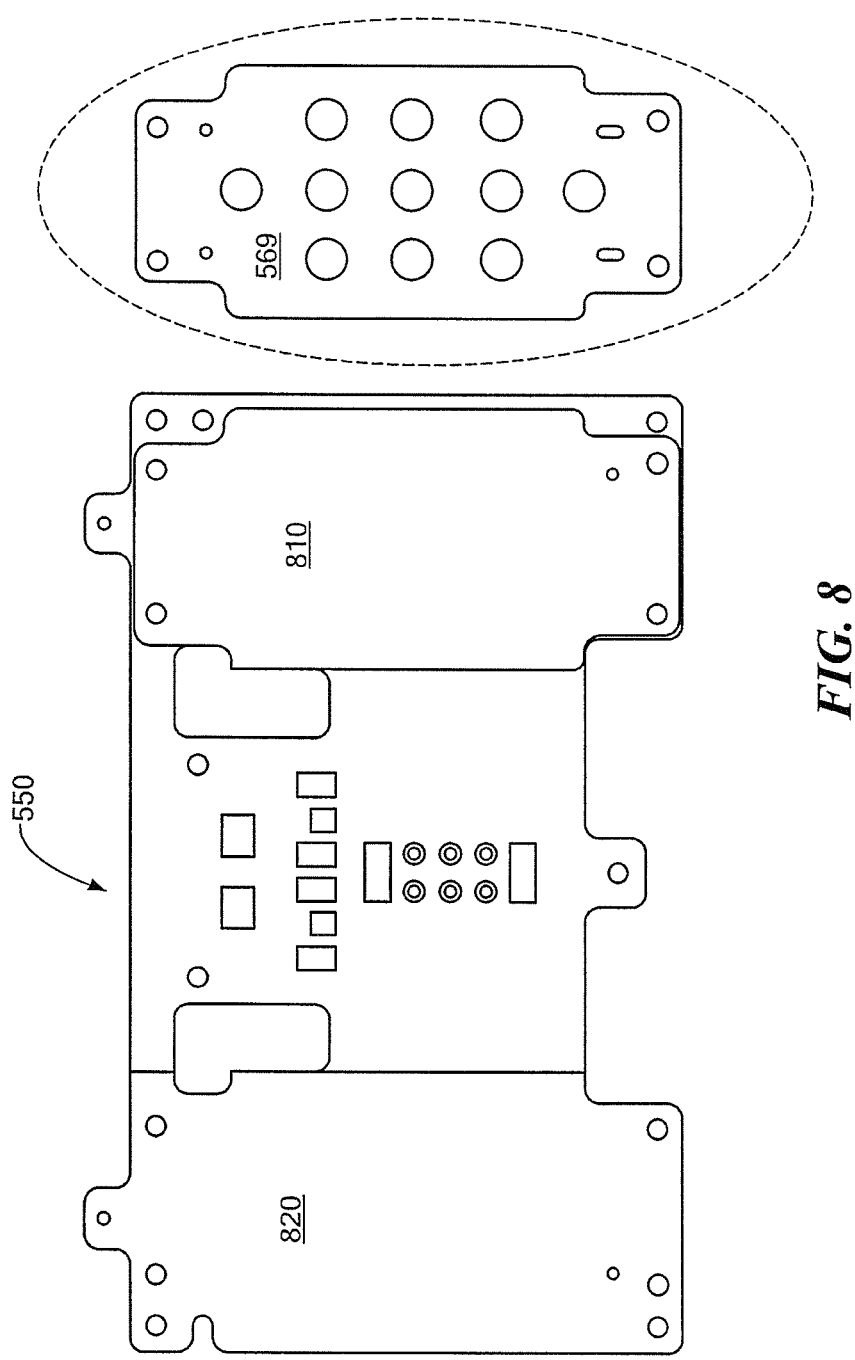

FIG. 8 illustrates certain of the component and structural placements on the circulator/isolator side 565 of monopulse processor module 550. A representative circulator/isolator 569 is shown de-mounted on the far right, exposing RF interposer plate 810, also referred to a "Fuzz-Buttons." The left side of monopulse processor module 550 shown the RF I/O pads 820 for making connection to RF interposer plate 810.

Advantageously, both the monopulse beamformer module and the monopulse processors modules can be RF tested prior to assembly.

It should be appreciated that the concepts described herein may be embodied in hardware, software, or any combination thereof, as those terms are currently known in the art. In particular, portions of the present apparatus may be implemented in software, firmware, and/or microcode operating on a computer or computers of any type. Additionally, software embodying the present invention may comprise computer instructions in any form (e.g., source code, object code, and/or interpreted code, etc.) stored in any computer-readable medium and used with the devices disclosed herein. Accordingly, the present invention is not limited to any particular platform, unless specifically stated otherwise in the present disclosure.

While particular embodiments of the present invention have been shown and described, it will be apparent to those skilled in the art that various changes and modifications in form and details may be made therein without departing from the spirit and scope of the invention as defined by the following claims. Accordingly, the appended claims encompass within their scope all such changes and modifications.

We claim:
1. A phased array having an aperture, the phased array comprising:
multiple sub-arrays, each of the multiple sub-arrays comprising:
a plurality of antenna elements;
a beamformer having a plurality of beamformer antenna ports operably coupled to the sub-array antenna elements, said beamformer configured to passively combine signals from the sub-array antenna elements, in a $2^n$:3 ratio wherein n is an integer corresponding to the number of beamformer antenna ports wherein said beamformer comprises:
a plurality of elevation signal couplers disposed between the beamformer antenna ports and a delta elevation signal port, said elevation signal couplers having one of a plurality of elevation coupling values;
a plurality of azimuth signal couplers disposed between the beamformer antenna ports and a delta azimuth signal port, said azimuth signal couplers having one of a plurality of azimuth coupling values; and
a plurality of transmit/sum signal couplers disposed between the beamformer antenna ports and a sum signal port, said sum signal couplers having one of a plurality of transmit/sum coupling values; and
wherein said beamformer forms monopulse signals at the sum signal port, the delta azimuth signal port, and the delta elevation signal port with the monopulse signals corresponding to: a sum signal, a delta azimuth signal, and a delta elevation signal for the sub-array and wherein:
the elevation coupling values of said analog monopulse beamformer are substantially identical in each of the multiple sub-arrays regardless of the physical position of said sub-array within the phased array;
the azimuth coupling values of said beamformer are substantially identical in each of the multiple sub-arrays regardless of the physical position of said sub-array within the phased array;
the transmit/sum coupling values of said beamformer are substantially identical in each of the multiple sub-arrays regardless of the position of said sub-array within the phased array; and
a monopulse processor having a sum signal port, a delta azimuth signal port and a delta elevation signal port operably connected to respective ones of the sum, delta azimuth and delta elevation signal ports of said beamformer, said monopulse processor configured to receive monopulse signals from said beamformer and apply a weight level to each of the monopulse signals independently of one another to form corresponding weighted monopulse signals for the first sub-array; wherein the weight levels are selected based upon the physical location of the sub-array within the aperture of the phased array.

2. The phased array of claim 1 further comprising a plurality of transmit/receive modules coupled between said plurality of antenna elements and said beamformer.

3. The phased array of claim 1, wherein said monopulse processor further comprises at least one weighting circuit configured to condition at least one monopulse signal provided from thereto from said beamformer.

4. The phased array of claim 1, wherein said monopulse processor is configured to provide controllable weight values to the monopulse signals, the controllable weight values assigned based upon the position of the sub-array within the phased array.

5. A method for monopulse beamforming in a phased array having an aperture and comprised of a plurality of subarray modules, each subarray module comprising a plurality of antenna elements, an analog beamformer and a monopulse processor, the method comprising:
   receiving return signals from a target at each of the plurality of sub-array modules in the phased array;
   at each subarray, coupling the return signal to the subarray beamformer and passively combining the return signals with a first set of elevation coupling values to form a delta elevation monopulse signal;
   at each subarray, coupling the return signal to the subarray beamformer and passively combining the return signals with a first set of azimuth coupling values to form a delta azimuth monopulse signal;
   at each subarray, coupling the return signal to the subarray beamformer and passively combining the return signals with a first set of sum coupling values to form a sum monopulse signals;
   providing the delta elevation, delta azimuth and sum monopulse signals to the monopulse processor associated with the sub-array;
   conditioning, in the monopulse processor each of the delta elevation, delta azimuth and sum monopulse signals independently of one another to form corresponding weighted monopulse signals for the first sub-array wherein said conditioning depends upon a physical position of the sub-array within the aperture of the phased array; and
   tracking said target using said weighted monopulse signals.

6. The method of claim 5, wherein said receiving said return signals further comprises conditioning the return signal from at least one of said antenna elements of the first sub-array prior to passively combining.

7. The method of claim 5, wherein said receiving said monopulse signals in said monopulse processor further comprises conditioning at least one of said monopulse signals using an active electronic component.

8. The method of claim 5, wherein said conditioning in the monopulse processor using an active electronic component comprises applying a weight to the delta elevation and delta azimuth monopulse signals using a weighting circuit.

9. The method of claim 5, wherein said conditioning in the monopulse processor comprises applying controllable weight values to the delta elevation and delta azimuth monopulse signals, the controllable weight values selected based upon the physical position of the sub-array within the aperture of the phased array.

10. The phased array of claim 1 wherein:
   said beamformer in each of said sub-array modules is provided as a passive analog monopulse beamformer; and
   said monopulse processor in each of said sub-array modules is provided as an active monopulse processor.

11. A phased array having an aperture, the phased array comprising:
   a plurality of sub-array modules, each sub-array module comprising:
      a sub-array of antenna elements;
      a beamformer having a plurality of beamformer antenna ports coupled to the sub-array antenna elements, said beamformer comprising:
         a plurality of elevation signal couplers coupled between the beamformer antenna ports and a delta elevation signal port of said beamformer, said plurality of elevation signal couplers having elevation coupling values wherein the elevation coupling values are identical in each of the plurality of sub-array modules regardless of the position of said sub-array module within the phased array aperture;
         a plurality of azimuth signal couplers coupled between the beamformer antenna ports and an azimuth elevation signal port of said beamformer, said plurality of azimuth signal couplers having azimuth coupling values wherein the azimuth coupling values are substantially identical in each of the plurality of sub-array modules regardless of the position of said sub-array module within the phased array aperture; and
         a plurality of transmit/sum signal couplers coupled between the beamformer antenna ports and a sum signal port of said beamformer, said plurality of transmit/sum signal couplers having transmit/sum coupling values wherein the transmit/sum coupling values are substantially identical in each of said plurality of sub-array modules regardless of the position of said sub-array module within the phased array aperture; and
         wherein in response to signals provided thereto from said sub-array antenna elements, said beamformer forms sum, delta azimuth and delta elevation monopulse signals for the sub-array module at respective ones of the sum, the delta azimuth, and the delta elevation signal ports of said beamformer; and
   an active monopulse processor having a sum signal port, a delta azimuth signal port and a delta elevation signal port coupled to respective ones of the sum, delta azimuth and delta elevation signal ports of said beamformer, said active monopulse processor configured to receive monopulse signals from said beamformer and apply a weight level to each of the monopulse signals independently of one another to form corresponding weighted monopulse signals for the sub-array module at corresponding ones of a sum output port, a delta azimuth output port and a delta elevation output port wherein the weight levels are selected based upon the physical location of the sub-array module within the phased array aperture.

12. The phased array of claim 11 wherein said plurality of elevation signal couplers are provided having a selected set of elevation coupling values and said plurality of azimuth signal couplers are provided having a selected set of azimuth coupling values and the elevation coupling values in the selected set of elevation coupling values match the azimuth coupling values in the selected set of azimuth coupling values.

13. The phased array of claim 11 wherein said plurality of elevation signal couplers are provided having a selected set of elevation coupling values and said plurality of azimuth signal couplers are provided having a selected set of azimuth coupling values and the elevation coupling values in the selected set of elevation coupling values differ from the azimuth coupling values in the selected set of azimuth coupling values.

14. The phased array of claim 11 wherein said active monopulse processor comprises:
   a sum signal processing branch having a first end coupled to the sum signal port and a second end coupled to a sum output port;
   at least one of:

a delta azimuth signal processing branch having a first end coupled to the delta azimuth signal port and a second end coupled to the delta azimuth output port; and a delta elevation signal processing branch having a first end coupled to the delta elevation signal port and a second end coupled to the delta elevation output port.

15. The phased array of claim 14 wherein:

said sum signal processing branch comprises at least one signal divider having an input coupled to the sum signal port, having a first output coupled to the sum output port and having a second output coupled to at least one of said delta azimuth signal processing branch and delta elevation signal processing branch;

said delta azimuth signal processing branch comprises: a signal combiner having an output coupled to the delta azimuth output port and having first and second inputs; an amplifier having an input coupled to the delta azimuth signal port and an output coupled to the first input of said signal combiner; a weighting circuit having an input coupled to the second output of said signal divider and having an output coupled to the second input of said signal combiner; and said delta elevation signal processing branch comprises: a signal combiner having an output coupled to the delta elevation output port and having first and second inputs; an amplifier having an input coupled to the delta elevation signal port and an output coupled to the first input of said signal combiner; a weighting circuit having an input coupled to the second output of said signal divider and having an output coupled to the second input of said signal combiner.

16. An active electronically steered phased array (AESA) having an aperture, the AESA comprising:

a plurality of AESA sub-array modules, each of the sub-array modules comprising:
    a sub-array of antenna elements;
    a passive, analog monopulse beamformer having a plurality of beamformer antenna ports coupled to the sub-array of antenna elements, said passive, analog monopulse beamformer configured to passively combine signals from the sub-array of antenna elements to form monopulse signals, said passive, analog monopulse beamformer comprising:
        a plurality of elevation signal couplers disposed between the beamformer antenna ports and a delta elevation signal port, said elevation signal couplers having elevation coupling values;
        a plurality of azimuth signal couplers disposed between the beamformer antenna ports and a delta azimuth signal port, said azimuth signal couplers having azimuth coupling values; and
        a plurality of transmit/sum signal couplers disposed between the beamformer antenna ports and a sum signal port, said sum signal couplers having transmit/sum coupling values; and
    wherein said passive, analog monopulse beamformer forms monopulse signals at the sum signal port, the delta azimuth signal port, and the delta elevation signal port with the monopulse signals corresponding to: a sum signal, a delta azimuth signal, and a delta elevation signal for the sub-array and wherein:
        the elevation coupling values of said passive, analog monopulse beamformer are substantially identical in each AESA sub-array module regardless of the position of said AESA sub-array module within the AESA;
        the azimuth coupling values of said passive, analog monopulse beamformer are substantially identical in each AESA sub-array module regardless of the position of said AESA sub-array module within the AESA;
        the transmit/sum coupling values of said passive, analog monopulse beamformer are substantially identical in each AESA sub-array module regardless of the position of said AESA sub-array module within the AESA; and
    an active monopulse processor having a sum signal port, a delta azimuth signal port and a delta elevation signal port coupled to respective ones of the sum, delta azimuth and delta elevation signal ports of said passive, analog monopulse beamformer, said active monopulse processor configured to receive monopulse signals from said passive analog monopulse beamformer and apply a weight level to each of the monopulse signals independently of one another to form corresponding weighted monopulse signals for the AESA sub-array module wherein the weight levels are selected based upon the physical location of the AESA sub-array module within the overall aperture of the AESA.

17. The phased array of claim 16 wherein said plurality of elevation signal couplers are provided having a selected set of elevation coupling values and said plurality of azimuth signal couplers are provided having a selected set of azimuth coupling values and the elevation coupling values in the selected set of elevation coupling values match the azimuth coupling values in the selected set of azimuth coupling values.

18. The phased array of claim 16 wherein said plurality of elevation signal couplers are provided having a selected set of elevation coupling values and said plurality of azimuth signal couplers are provided having a selected set of azimuth coupling values and the elevation coupling values in the selected set of elevation coupling values differ from the azimuth coupling values in the selected set of azimuth coupling values.

19. The phased array of claim 16 wherein said active monopulse processor comprises:

a sum signal processing branch having a first end coupled to the sum signal port and a second end coupled to a sum output port;

at least one of:
    a delta azimuth signal processing branch having a first end coupled to the delta azimuth signal port and a second end coupled to the delta azimuth output port; and
    a delta elevation signal processing branch having a first end coupled to the delta elevation signal port and a second end coupled to the delta elevation output port.

20. The phased array of claim 19 wherein:

said sum signal processing branch comprises at least one signal divider having an input coupled to the sum signal port, having a first output coupled to the sum output port and having a second output coupled to at least one of said delta azimuth signal processing branch and delta elevation signal processing branch;

said delta azimuth signal processing branch comprises: a signal combiner having an output coupled to the delta azimuth output port and having first and second inputs; an amplifier having an input coupled to the delta azimuth signal port and an output coupled to the first input of said signal combiner; a weighting circuit having an input coupled to the second output of said signal divider and having an output coupled to the second input of said signal combiner; and said delta elevation signal processing branch comprises: a signal combiner having an output coupled to the delta elevation output port and having first and second inputs; an amplifier having an input coupled to the delta elevation signal port and an output coupled to the first input of said signal combiner; a weighting circuit having an input coupled to the second output of said signal divider and having an output coupled to the second input of said signal combiner.

* * * * *